(12) United States Patent
    Abramczyk et al.

(10) Patent No.: US 11,370,380 B1
(45) Date of Patent: Jun. 28, 2022

(54) CURTAIN AIRBAG ASSEMBLY WITH INFLATABLE FLAP

(71) Applicant: Ford Global Technologies, LLC, Dearborn, MI (US)

(72) Inventors: Joseph E. Abramczyk, Farmington Hills, MI (US); Zhibing Deng, Northville, MI (US); Deepak Patel, Canton, MI (US); Lavanya Vemuri, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/113,367

(22) Filed: Dec. 7, 2020

(51) Int. Cl.
| | |
|---|---|
| *B60R 21/213* | (2011.01) |
| *B60R 21/231* | (2011.01) |
| *B60R 21/233* | (2006.01) |
| *B60R 21/00* | (2006.01) |
| *B60R 21/264* | (2006.01) |

(52) U.S. Cl.
CPC .......... *B60R 21/213* (2013.01); *B60R 21/233* (2013.01); *B60R 21/23138* (2013.01); *B60R 21/264* (2013.01); *B60R 2021/0006* (2013.01); *B60R 2021/23308* (2013.01); *B60R 2021/23332* (2013.01)

(58) Field of Classification Search
CPC ............ B60R 21/213; B60R 21/23138; B60R 21/233; B60R 21/264; B60R 2021/0006; B60R 2021/23308; B60R 2021/23332; B60R 21/232; B60R 2021/23324
See application file for complete search history.

(56) References Cited

U.S. PATENT DOCUMENTS

| | | | |
|---|---|---|---|
| 5,324,072 A | 6/1994 | Olson et al. | |
| 5,730,464 A | 3/1998 | Hill | |
| 6,338,498 B1 * | 1/2002 | Niederman | B60R 21/213 |
| | | | 280/728.2 |
| 6,422,593 B1 * | 7/2002 | Ryan | B60R 21/232 |
| | | | 280/730.2 |
| 6,457,740 B1 * | 10/2002 | Vaidyaraman | B60R 21/231 |
| | | | 280/730.2 |
| 7,290,798 B2 * | 11/2007 | Mori | B60R 21/214 |
| | | | 280/730.1 |
| 7,390,016 B2 * | 6/2008 | Noguchi | B60R 21/232 |
| | | | 280/730.2 |
| 8,408,591 B2 * | 4/2013 | Walston | B60R 21/213 |
| | | | 280/730.2 |
| 9,016,717 B1 * | 4/2015 | Clauser | B60R 21/233 |
| | | | 280/729 |
| 2020/0001819 A1 | 1/2020 | Moon | |

FOREIGN PATENT DOCUMENTS

JP 201246175 A 3/2012

\* cited by examiner

*Primary Examiner* — Paul N Dickson
*Assistant Examiner* — Tiffany L Webb
(74) *Attorney, Agent, or Firm* — Frank A. MacKenzie; Bejin Bieneman PLC (57) ABSTRACT

An assembly for a vehicle includes an airbag inflator. The assembly includes a curtain airbag including a main lobe and an inflatable flap. The main lobe and the inflatable flap are each inflatable by the airbag inflator to an inflated position. The main lobe includes an inboard panel and an outboard panel. The inflatable flap is at the inboard panel in the inflated position. The inflatable flap, in the inflated position, is at the inboard panel and abutting the inflator.

20 Claims, 8 Drawing Sheets

CURTAIN AIRBAG ASSEMBLY WITH INFLATABLE FLAP

BACKGROUND

During a vehicle impact, occupants may move in a direction influenced by the momentum of a vehicle. Some vehicle impacts, e.g., side impact, frontal offset impacts, far side oblique impacts, near side oblique impacts, etc., may cause the occupants to move cross-vehicle and/or at an angle towards vehicle components, e.g., toward a pillar, door, etc. Occupant injury risk is dependent upon specific crash scenarios and the interaction of an occupant with vehicle components.

DETAILED DESCRIPTION

A vehicle includes a roof rail. The vehicle includes an airbag inflator mounted to the roof rail. The assembly includes a curtain airbag supported by the roof rail and including a main lobe and an inflatable flap. The main lobe and the inflatable flap each being inflatable by the airbag inflator to an inflated position. The main lobe in the inflated position extends downwardly from the roof rail. The inflatable flap in the inflated position abuts the inflator and being vehicle-inboard relative to the inflator.

The main lobe may be fluidly connected to the inflatable flap.

The main lobe may be directly fluidly connected to the airbag inflator and the inflatable flap may be indirectly fluidly connected to the airbag inflator through the main lobe.

The inflatable flap may abut the main lobe and may be vehicle-inboard of the main lobe in the inflated position.

The main lobe may include an outboard panel, an inboard panel vehicle-inboard of the outboard panel, and an inflation chamber between the outboard panel and the inboard panel, the inflatable flap abutting the inboard panel and being inboard of the inboard panel.

The main lobe may include an upper edge adjacent and extending along the roof rail, the inflatable flap extending from the upper edge of the main lobe.

The curtain airbag may include a tube extending from the main lobe to the airbag inflator, the inflatable flap abutting the tube.

The inflatable flap may extend from the main lobe below the airbag inflator and extends upwardly from the main lobe above the inflator.

The inflatable flap may be an endless loop defining a bore.

The airbag inflator may be in the bore of the inflatable flap.

The inflatable flap may include a first uninflatable portion and a second uninflatable portion fixed to each other about the bore.

The inflatable flap may define an inflation chamber extending annularly about the bore from the first uninflatable portion to the second uninflatable portion.

The inflation chamber of the inflatable flap may be in fluid communication with the main lobe through a passageway spaced from the inflator.

The first uninflatable portion and the second uninflatable portion may be between the inflator and the main lobe in the inflated position.

The main lobe may include an upper edge and a vent below the upper edge, and wherein the inflatable flap includes an upper edge and an inlet spaced from the upper edge of the inflatable flap and sewn to the main lobe about the vent.

The upper edge of the main lobe may be stitched closed and the upper edge of the inflatable flap is stitched closed.

An assembly includes an airbag inflator. The assembly includes a curtain airbag including a main lobe and an inflatable flap, the main lobe and the inflatable flap each inflatable by the airbag inflator to an inflated position. The main lobe has an inboard panel and an outboard panel. The inflatable flap is at the inboard panel in the inflated position. The inflatable flap in the inflated position is at the inboard panel and abutting the inflator.

The main lobe may be fluidly connected to the inflatable flap.

The main lobe may be directly fluidly connected to the airbag inflator and the inflatable flap may be indirectly fluidly connected to the airbag inflator through the main lobe.

The inflatable flap may extend from the main lobe below the airbag inflator and extends upwardly from the main lobe above the inflator.

With reference to the Figures, wherein like numerals indicate like parts throughout the several views, an assembly 10 for a vehicle 12 includes an airbag inflator 14. The assembly 10 includes a curtain airbag 16 including a main lobe 18 and an inflatable flap 20. The main lobe 18 and the inflatable flap 20 are each inflatable by the airbag inflator 14 to an inflated position. The main lobe 18 includes an inboard panel 22 and an outboard panel 24. The inflatable flap 20 in the inflated position is at the inboard panel 22 and abutting the airbag inflator 14.

In the event of an impact to the vehicle 12, the curtain airbag 16 may inflate to control the kinematics of an occupant. In the inflated position, the inflatable flap 20 abuts the airbag inflator 14 to limit an occupant from contacting the airbag inflator 14 in the event of an impact to the vehicle 12. Since the inflatable flap 20 is at the inboard panel 22 and abuts the airbag inflator 14, the inflatable flap 20 is between the occupant and the airbag inflator 14 to prevent or reduce the probability that the occupant, e.g., the head of the occupant, contacts the airbag inflator 14. The inflatable flap 20 adds thickness to the curtain airbag 16 at the airbag inflator 14 to increase the energy absorption in the event of an impact to the vehicle 12.

Figure 3:
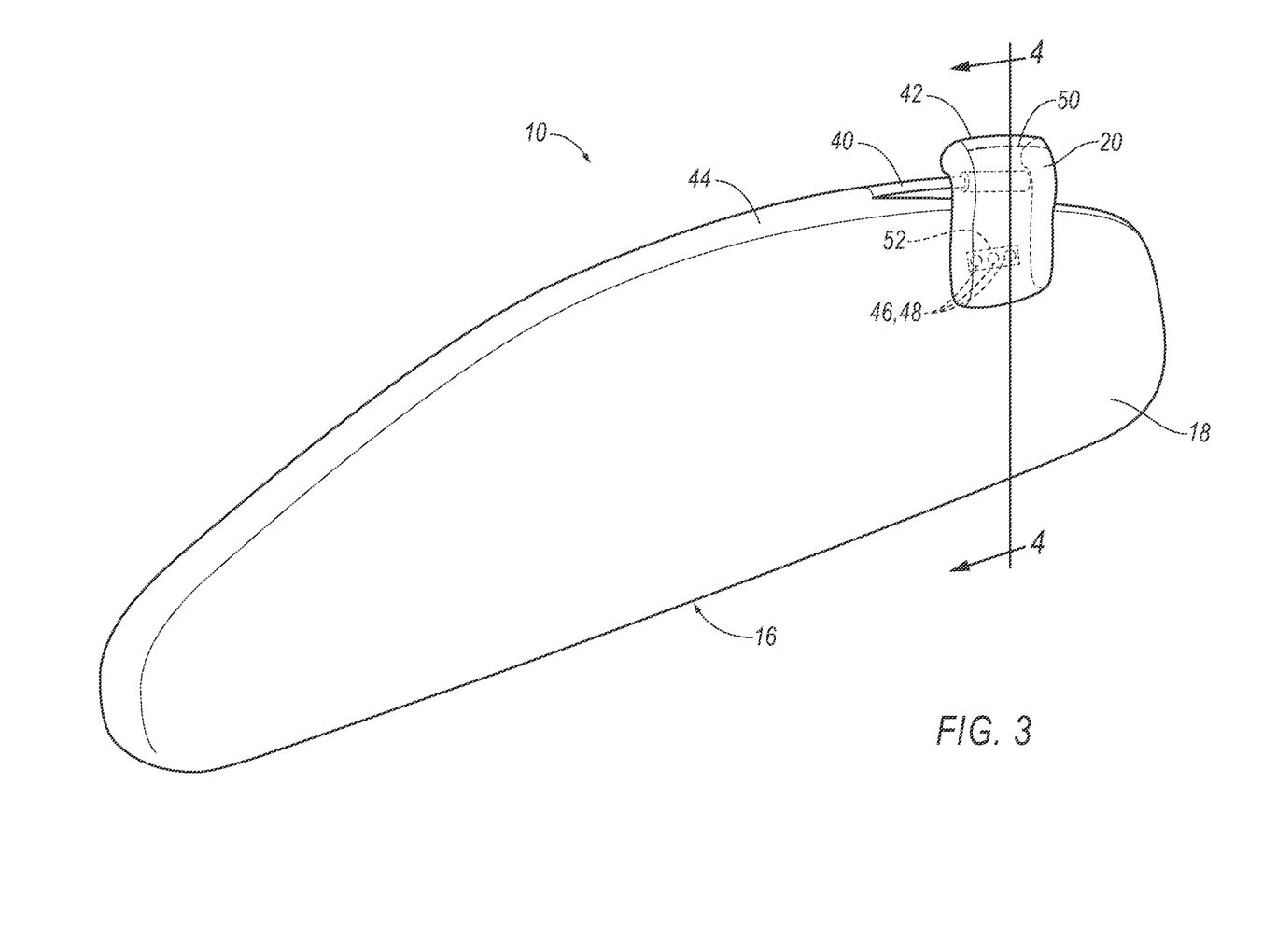
FIG. 3 is a perspective view of a first embodiment of the curtain airbag including an inflatable flap adjacent an airbag inflator in the inflated position.
Figure 4:
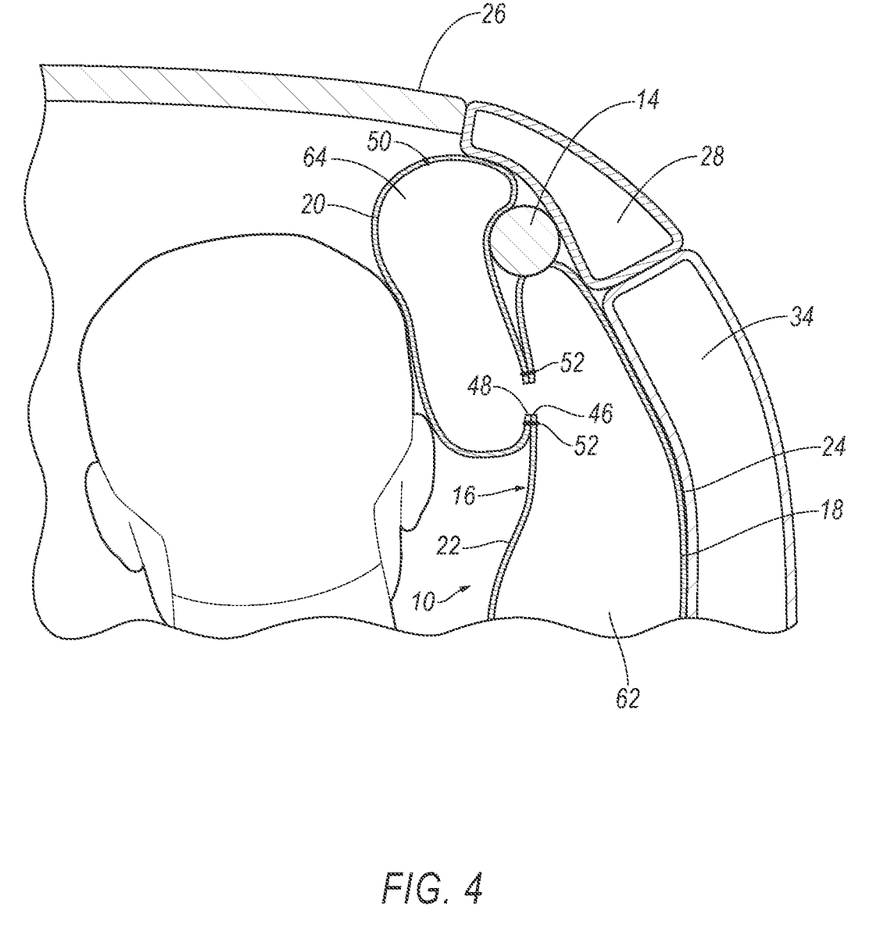
FIG. 4 is a cross-sectional view through line A of the first embodiment shown in FIG. 3.
Figure 5A:
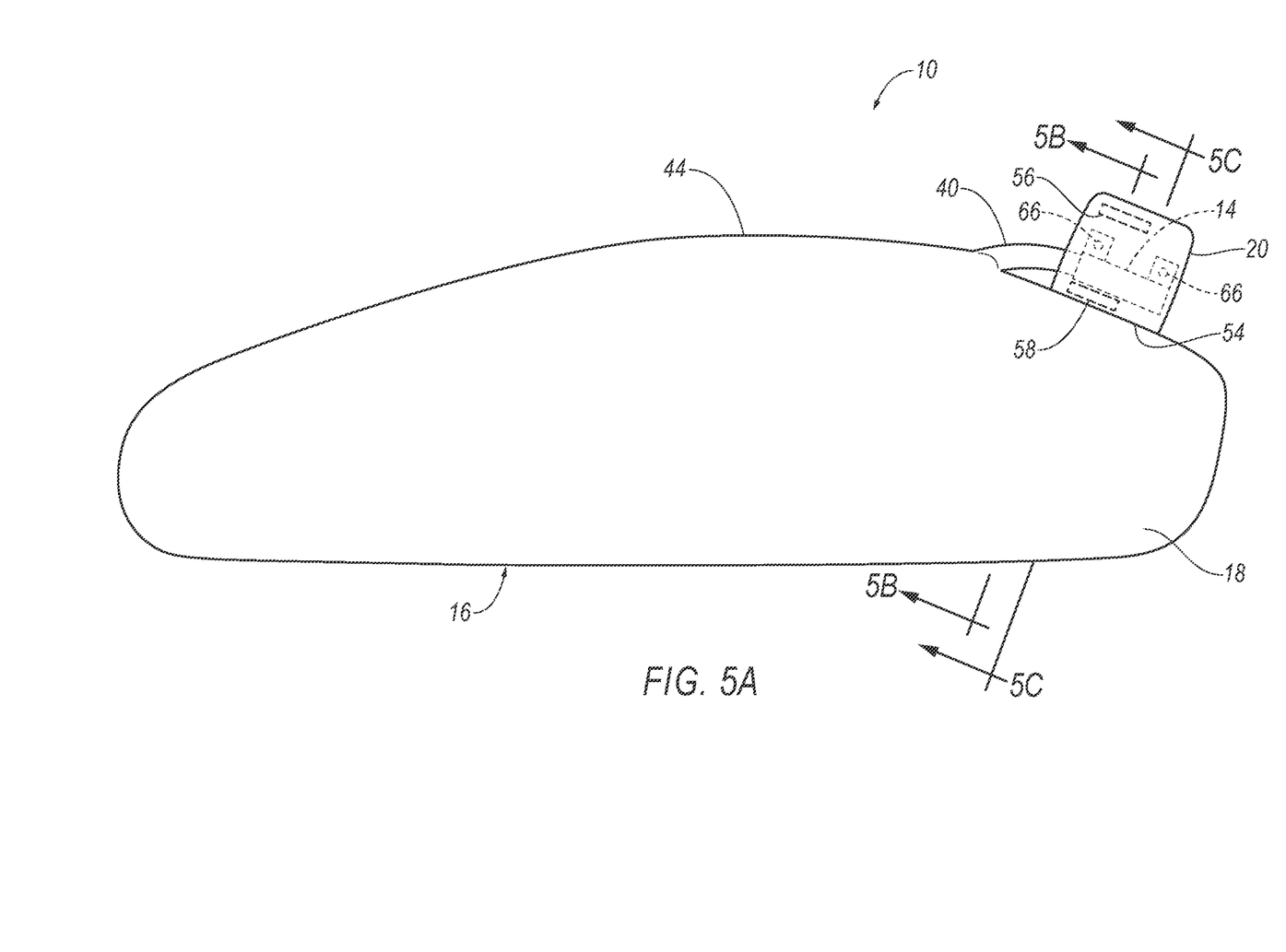
FIG. 5A is a front view of an example of the curtain airbag in an unassembled and uninflated position that may be assembled into a second, a third, and a fourth embodiment of the curtain airbag.
Figure 5B:
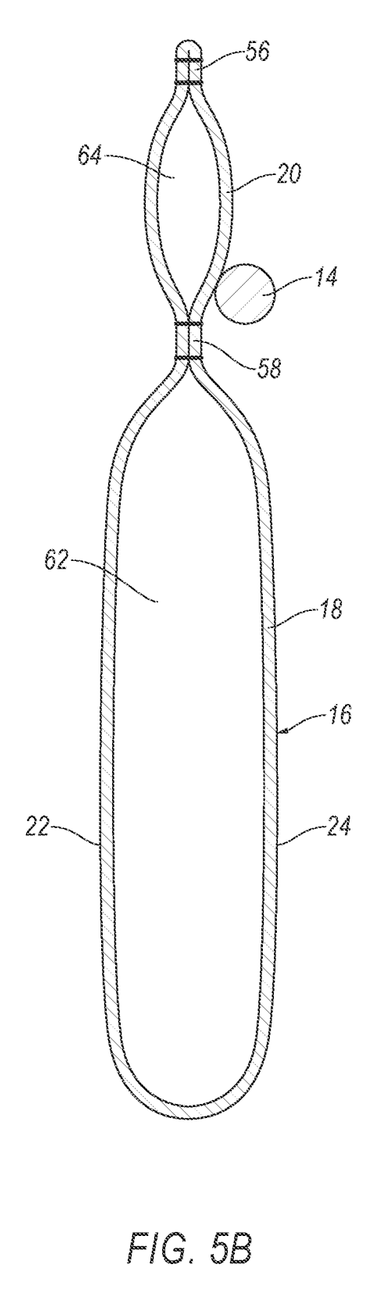
FIG. 5B is a cross-sectional view through line B shown in FIG. 5A.
Figure 5C:
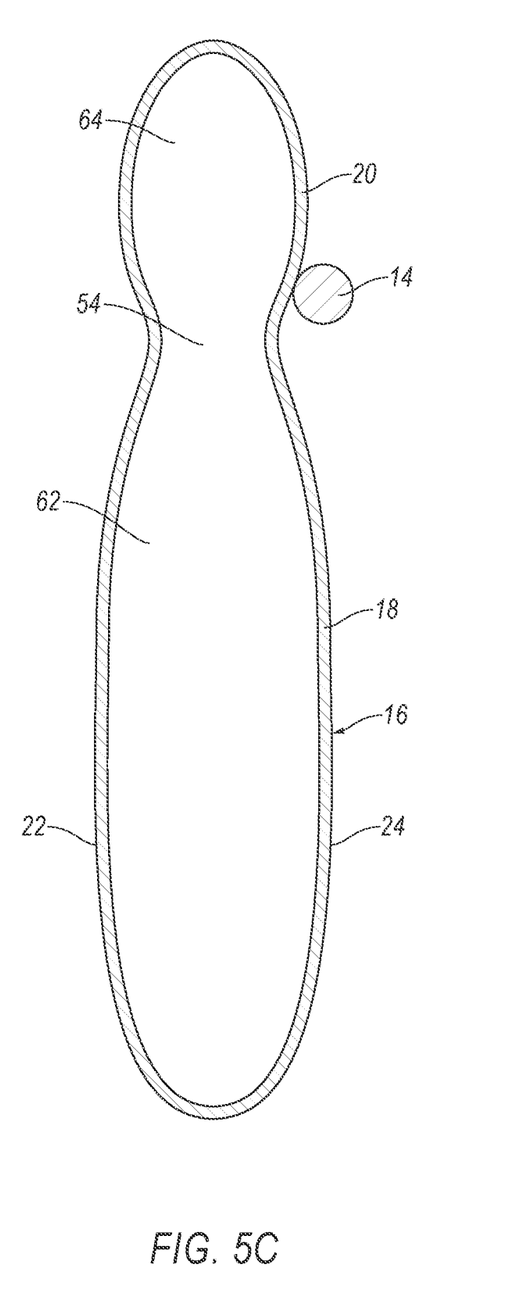
FIG. 5C is a cross-sectional view through line C shown in FIG. 5B.
Figures 6, 7:
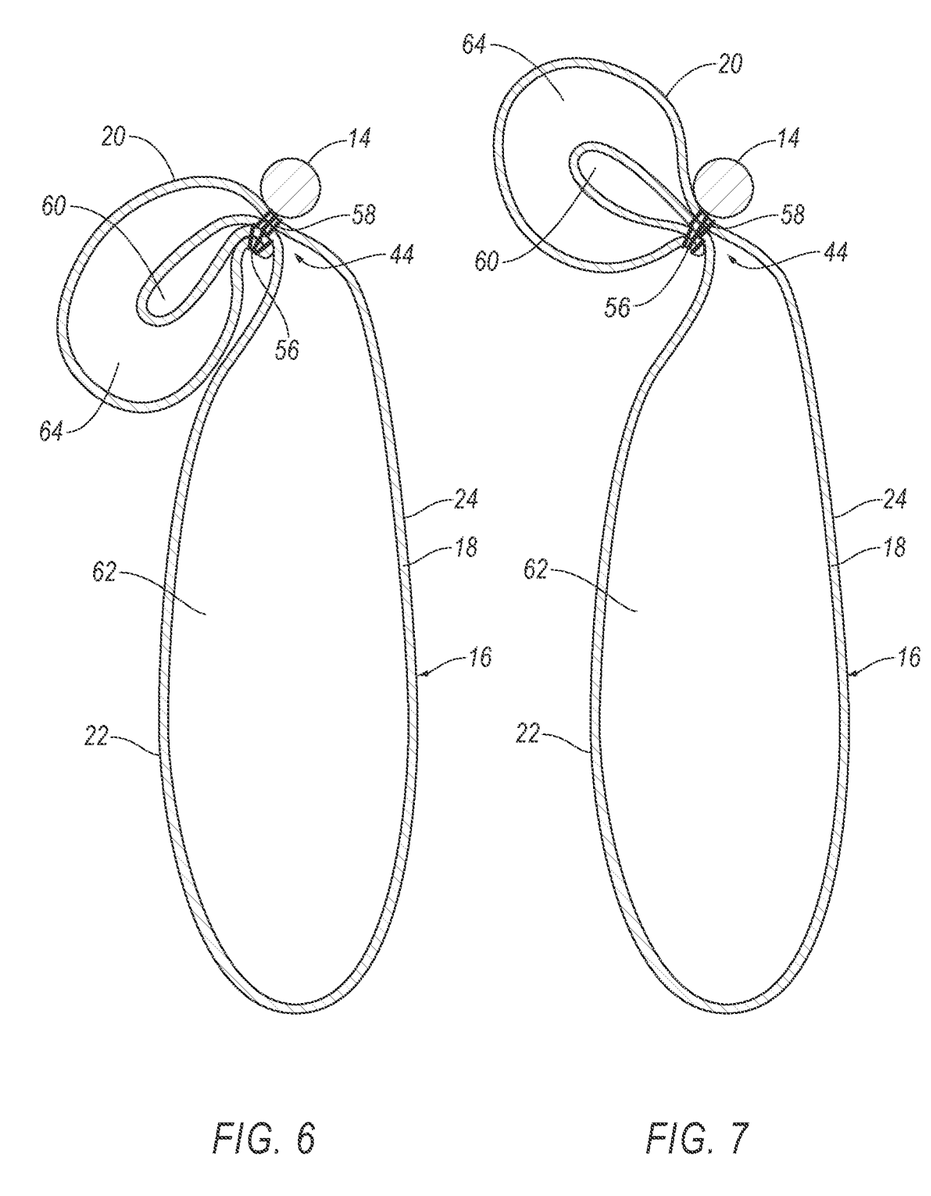
FIG. 6 is a cross-sectional view through line B of FIG. 5A after assembly into the second embodiment of the curtain airbag and with the curtain airbag in the inflated position.
FIG. 7 is a cross-sectional view through line B of FIG. 5A after assembly into the third embodiment of the curtain airbag and with the curtain airbag in the inflated position.
Figure 8:
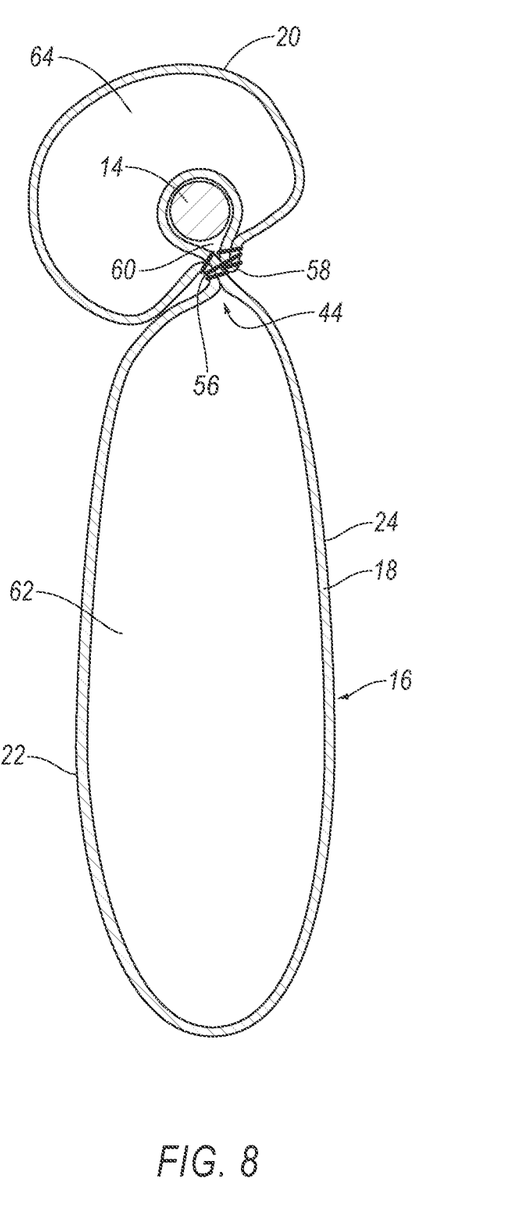
FIG. 8 is a cross-sectional view through line B of FIG. 5A after assembly into the fourth embodiment of the curtain airbag and with the curtain airbag in the inflated position.

Four example embodiments are shown in the Figures and common numerals are used to identify common features in the example embodiments. One embodiment of the assembly 10 is shown in FIGS. 2-4. In such an example, the inflatable flap 20 is connected to the main lobe 18 at the inboard panel 22 of the main lobe 18. A second embodiment of the assembly 10 is shown in FIG. 6. In such an example, the inflatable flap 20 extends downwardly from an upper edge 44 of the main lobe 18. A third embodiment of the assembly 10 is shown in FIG. 7. In such an example, the inflatable flap 20 extends upwardly from the upper edge 44 the main lobe 18. A fourth embodiment of the assembly 10 is shown in FIG. 8. In such an example, the inflatable flap 20 extends in an endless loop around the airbag inflator 14. FIGS. 5A-C show an example of the curtain airbag in an unassembled and uninflated position that may be assembled into the second, third, or fourth embodiment of the curtain airbag With reference to FIGS. 1 and 2, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle body 30. The vehicle body 30 may be of a unibody construction. In the unibody construction, the body, e.g., rockers, serves as a frame, and the body (including the rockers, pillars, roof rails 28, etc.) is unitary, i.e., a continuous one-piece unit. As another example, the vehicle body 30 and frame may have a body-on-frame construction (also referred to as a cab-on-frame construction). In other words, the vehicle body 30 and frame are separate components, i.e., are modular, and the vehicle body 30 is supported on and affixed to the frame. Alternatively, the vehicle body 30 may have any suitable construction. The vehicle body 30 may be formed of any suitable material, for example, steel, aluminum, etc.

The vehicle body 30 includes body panels partially defining an exterior of the vehicle 12. The body panels may present a class-A surface, e.g., a finished surface exposed to view by a customer and free of unaesthetic blemishes and defects. The body panels include, e.g., a roof 26, etc.

The vehicle 12 includes a pair of roof rails 28. Specifically, the vehicle body 30 includes the roof rails 28. The roof rails 28 are spaced from one another in a cross-vehicle direction. The roof rails 28 each extend longitudinally along the vehicle body 30, i.e., along a longitudinal axis of the vehicle body 30. The first of the roof rails 28 may extend along the passenger side of the passenger compartment 32 and the second of the roof rails 28 may extend along the driver side of the passenger compartment 32. The assembly 10 is supported one of the roof rails 28 of the vehicle body 30. The roof rails 28 may support the roof 26 of the vehicle 12. The vehicle 12 may include a pair of assemblies 10, each assembly 10 being supported by one of the roof rails 28.

The vehicle body 30 may define a passenger compartment 32 to house occupants, if any, of the vehicle 12. The passenger compartment 32 may extend across the vehicle 12, i.e., from one side to the other side of the vehicle 12. The passenger compartment 32 includes a front end and a rear end with the front end being in front of the rear end during forward movement of the vehicle 12. The passenger compartment 32 includes a passenger side and a driver side. The passenger side may be on the right side of the passenger compartment 32 during forward movement of the vehicle 12. The driver side may be on the left side of the passenger compartment 32 during forward movement of the vehicle 12.

The vehicle 12 may include a headliner (not shown) supported by the vehicle body 30. The headliner may be mounted adjacent the roof 26 at a top portion of the passenger compartment 32. The headliner may conceal the roof 26 from inside the passenger compartment 32. The headliner includes a class-A surface facing the passenger compartment 32, i.e., a surface specifically manufactured to have a high quality, finished, aesthetic appearance free of blemishes.

Figure 1:
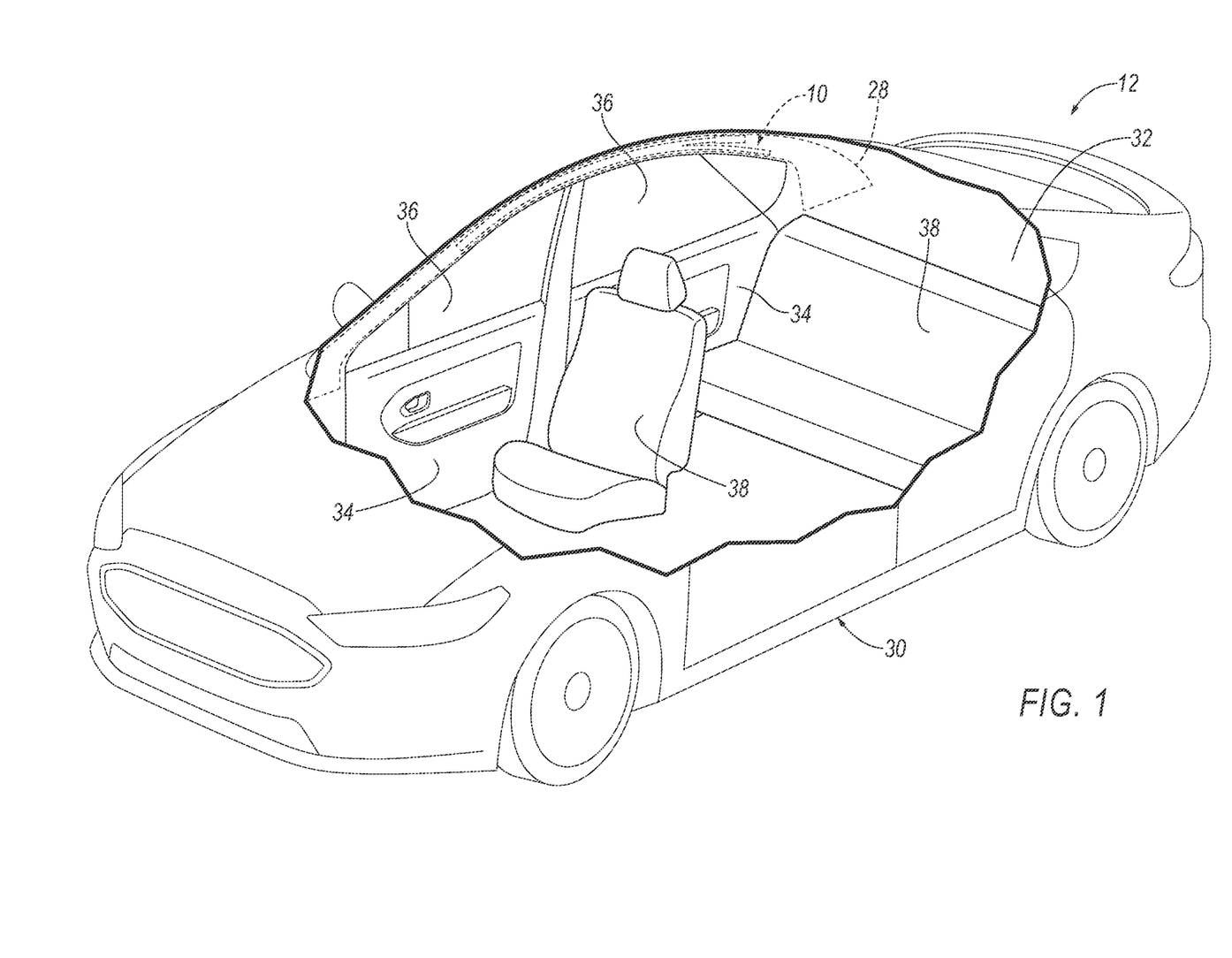
FIG. 1 is a perspective view of a vehicle including a curtain airbag in an uninflated position.
Figure 2:
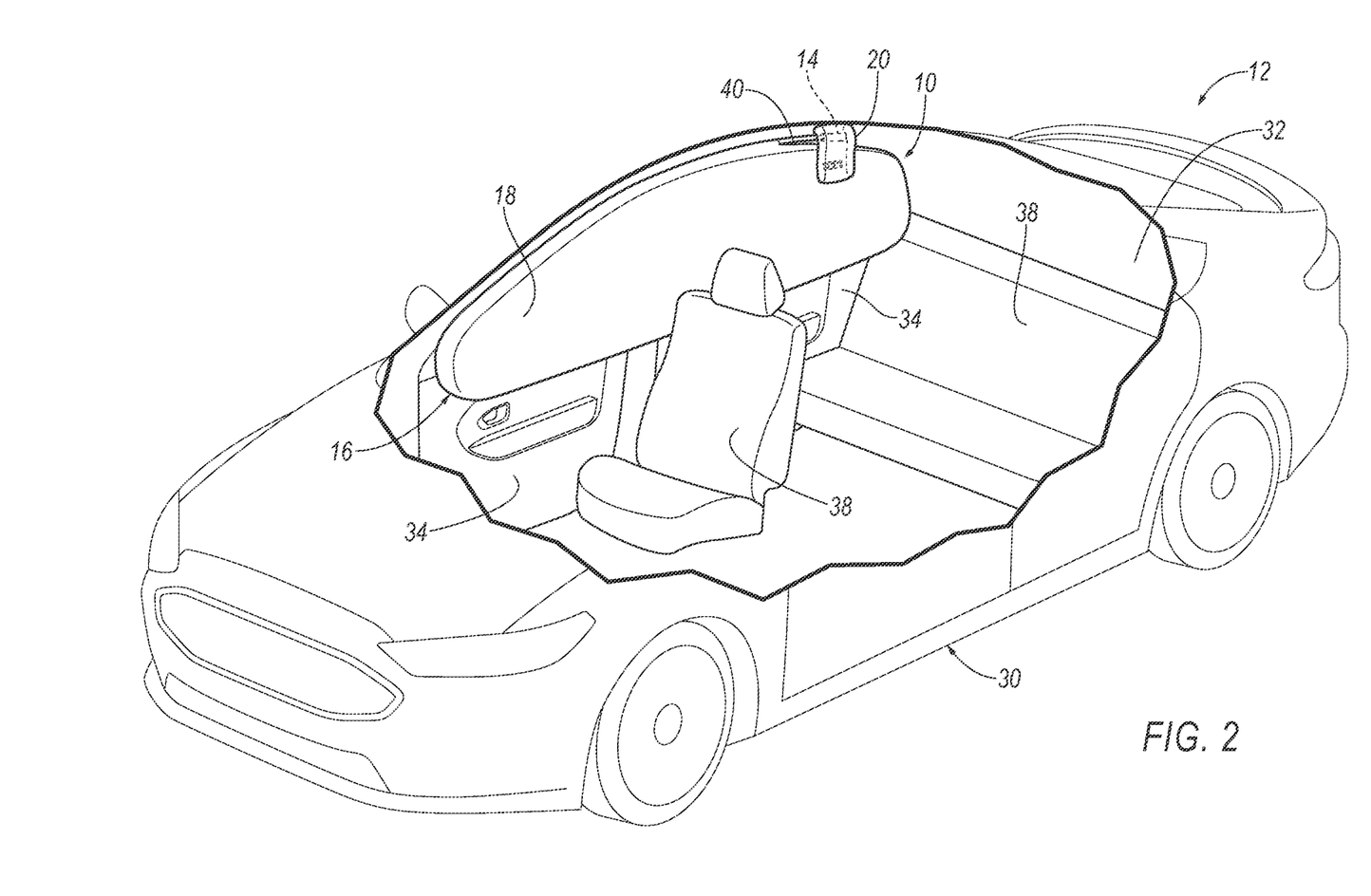
FIG. 2 is a perspective view of the vehicle including the curtain airbag in an inflated position.

With continued reference to FIGS. 1 and 2, the vehicle 12 includes doors 34 openable for occupants to enter and exit a passenger cabin. The roof rails 28 contact a top edge of the doors 34. The door 34 includes a window opening (not numbered), an opening completely closed by a window 36 if the window 36 is in a fully raised position. The window opening is defined by a door trim and a door panel on a bottom edge and either by the door 34 circumscribing the window opening or by the vehicle body 30, e.g., the A pillar, the B pillar, and the roof 26 rail.

The vehicle 12 includes a seat 38 adjacent one of the doors 34. The vehicle 12 may include any suitable number of seats 38 and the seats 38 may be arranged in any suitable arrangement in the passenger compartment 32. As in the example shown in the Figures, one or more of the seats 38 may be at the front end of the passenger compartment 32, e.g., a driver seat 38 and/or a passenger seat 38. In other examples, one or more of the seats 38 may be behind the front end of the passenger compartment 32, e.g., at the rear end of the passenger compartment 32. The seat 38 may be movable relative to the floor to various positions, e.g., movable fore-and-aft and/or cross-vehicle. The seat 38 may be of any suitable type, e.g., a bucket seat shown in FIG. 1.

The assembly 10 includes the curtain airbag 16 and the airbag inflator 14. The airbag inflator 14 is in fluid communication with the curtain airbag 16. The airbag inflator 14 expands the curtain airbag 16 with inflation medium, such as a gas, to move the curtain airbag 16 from an uninflated position to an inflated position. The airbag inflator 14 may be, for example, a pyrotechnic inflator that ignites a chemical reaction to generate the inflation medium, a stored gas inflator that releases (e.g., by a pyrotechnic valve) stored gas as the inflation medium, or a hybrid.

The curtain airbag 16 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

As discussed above, the assembly 10 may be supported by one of the roof rails 28. Specifically, the curtain airbag 16 and the airbag inflator 14 may be supported by the roof rail 28. The airbag inflator 14 may include brackets 66 to support the airbag inflator 14 on the roof rail 28. The bracket 66 may be supported by the roof rail 28 in any suitable manner, e.g., fasteners. In the example shown in the Figures, the assembly 10 is supported by the roof rail 28 on the passenger side of the passenger compartment 32. The assembly 10 may be supported by the roof rail 28 on the driver side of the passenger compartment 32. The vehicle 12 may include a pair of assemblies 10. In such an example, the first of the assemblies 10 may be supported on the passenger side of the passenger compartment 32 and the second of the assemblies 10 may be supported on the driver side of the passenger compartment 32. The assembly 10 may be concealed behind the headliner in the uninflated position.

In the inflated position, the curtain airbag 16 extends along the roof rail 28 longitudinally in the vehicle 12, i.e., along the longitudinal axis of the vehicle 12. The curtain airbag 16 may extend from the front end of the passenger compartment 32 to the rear end of the passenger compartment 32 along the roof rail 28 of the vehicle body 30.

The curtain airbag 16 extends downwardly from the roof rail 28 between the door 34 and the seat 38. The curtain airbag 16 extends between the door 34 and the occupant when the airbag is in the inflated position, i.e., adjacent the occupant. Specifically, the main lobe 18 extends downwardly from the roof rail 28 adjacent the door 34 and window 36. In the event of an impact to the vehicle 12, the curtain airbag 16 inflates to the inflated position adjacent the occupant to control the kinematics of the occupant.

The main lobe 18 includes the outboard panel 24 and the inboard panel 22 vehicle-inboard of the outboard panel 24. In the inflated position, the outboard panel 24 may abut the door 34 and/or window 36 of the vehicle 12, i.e., the outboard panel 24 faces vehicle-outboard. In other words, the outboard panel 24 faces away from the passenger compartment 32 in the inflated position. In the inflated position, the inboard panel 22 spaced vehicle-inboard from the outboard panel 24. The inboard panel 22 faces toward the passenger compartment 32, i.e., vehicle-inboard, and may abut the occupant in the event of an impact to the vehicle 12.

The main lobe 18 defines an inflation chamber 62 between the outboard panel 24 and the inboard panel 22, i.e., in the inflated position, the inboard panel 22 may be spaced vehicle-inboard from the outboard panel 24 by the inflation chamber 62. The airbag inflator 14 is in communication with the inflation chamber 62. Specifically, the main lobe 18 is directly fluidly connected to the airbag inflator 14. As in the example shown in the Figures, the curtain airbag 16 may include a tube 40 extending from the main lobe 18 to the airbag inflator 14. The tube 40 may be referred to as a Y-sock. The airbag inflator 14 fills the inflation chamber 62 with inflation medium by passing inflation medium through the tube 40 and into the main lobe 18. The inflation medium expands the curtain airbag 16 to the inflated position through the tube 40.

The main lobe 18 includes an upper edge 44 adjacent the roof rail 28. As discussed above, the curtain airbag 16 extends along the roof rail 28. Specifically, the upper edge 44 of the main lobe 18 extends along the roof rail 28. The upper edge 44 may extend from the front end of the passenger compartment 32 to the rear end of the passenger compartment 32. The outboard panel 24 and the inboard panel 22 may meet at the upper edge 44 of the main lobe 18. For example, the outboard panel 24 and the inboard panel 22 may be two separate panels, i.e., the upper edge 44 of the main lobe 18 may be stitched closed to join the outboard panel 24 and the inboard panel 22. As another example, the outboard panel 24 and the inboard panel 22 may be unitary, i.e., one-piece without seams or joints connecting the outboard panel 24 and the inboard panel 22. In any event, as set forth above, the inboard panel 22 faces vehicle-inboard and the outboard panel 24 faces vehicle-outboard.

The curtain airbag 16 includes the inflatable flap 20 connected to the main lobe 18 of the curtain airbag 16. The inflatable flap 20 is positioned adjacent the airbag inflator 14 and abuts the airbag inflator 14 in the inflated position. The inflatable flap 20 is vehicle-inboard relative to the airbag inflator 14 to add thickness to the curtain airbag 16 at the airbag inflator 14, i.e., the inflatable flap 20 is between the airbag inflator 14 and the occupant in the inflated position. The added thickness of the inflatable flap 20 at the airbag inflator 14 limits an occupant from contacting the airbag inflator 14 in the event of an impact to the vehicle 12 where the curtain airbag 16 inflates to the inflated position.

The inflatable flap 20 defines an inflation chamber 64 that fills with inflation medium when the curtain airbag 16 inflates to the inflated position. The main lobe 18 is fluidly connected to the inflatable flap 20, i.e., the inflation chamber 62 of the main lobe 18 is fluidly connected to the inflation chamber 64 of the inflatable flap 20. The main lobe 18 and the inflatable flap 20 are each inflatable by the airbag inflator 14 to the inflated position. The inflatable flap 20 is indirectly fluidly connected to the airbag inflator 14 through the main lobe 18. In other words, other components of the curtain airbag 16 are between the inflatable flap 20 and the airbag inflator 14. In the examples shown in the figures, inflation medium that has passed through the tube 40 from the airbag inflator 14 into the main lobe 18 then passes through the main lobe 18 and into the inflatable flap 20, i.e., the inflation chamber 64 of the inflatable flap 20.

In the embodiment shown in FIGS. 2-4, the inflatable flap 20 is connected to the main lobe 18 at the inboard panel 22 of the main lobe 18. The inflatable flap 20 is connected to the inboard panel 22 of the main lobe 18 at a position below the airbag inflator 14, i.e., below the upper edge 44 of the main lobe 18. In the inflated position, the inflatable flap 20 abuts the inboard panel 22 and is vehicle-inboard of the inboard panel 22. The inflatable flap 20 may be between the occupant and the airbag inflator 14 to add thickness to the curtain airbag 16 in the inflated position in the event of an impact to the vehicle 12.

The inflatable flap 20 extends upwardly from the main lobe 18 above the airbag inflator 14 to an upper end 42. The upper end 42 of the inflatable flap 20 may be between the airbag inflator 14 and the roof 26 of the vehicle 12. The inflatable flap 20 may abut the tube 40 extending from the airbag inflator 14 to the main lobe 18. The upper end 42 of the inflatable flap 20 may extend above the tube 40 in the inflated position.

With continued reference to the embodiment shown in FIGS. 2-4, the main lobe 18 includes a vent 46, e.g., a hole, below the upper edge 44 of the main lobe 18. The vent 46 may be defined by the inboard panel 22 of the main lobe 18. The inflatable flap 20 includes an inlet 48, e.g., a hole, spaced from the upper end 42 of the inflatable flap 20. In such an embodiment, the inlet 48 and the vent 46 are aligned with each other and the inlet 48 is sewn to the main lobe 18 about the vent 46. The inflatable flap 20 may be connected to the main lobe 18 by the sewing of the inlet 48 about the vent 46. In other words, the inflatable flap 20 is sewn to the inboard panel 22 of the main lobe 18 about the vent 46 in the inboard panel 22. When inflating to the inflated position, inflation medium may pass from the main lobe 18, through the vent 46 and inlet 48, and into the inflatable flap 20 when the curtain airbag 16 inflates to the inflated position.

FIG. 4 shows an occupant adjacent the assembly 10 when the assembly 10 is in the inflated position. As stated above, the assembly 10 is supported by the roof rail 28 of the vehicle body 30. The curtain airbag 16 is inflatable adjacent the door 34 of the vehicle body 30. The headliner is not shown in this view.

The inflatable flap 20 includes a stitch 50 along the upper end 42 of the inflatable flap 20. The stitch 50 closes and seals the inflatable flap 20 such that the inflation chamber 64 of the inflatable flap 20 may hold inflation medium in the inflated position. During assembly 10 of the curtain airbag 16 in the embodiment shown in FIGS. 2-4, the upper end 42 of the inflatable flap 20 is open to allow for sewing of the inlet 48 about the vent 46, i.e., the sewing of the inflatable flap 20 to the inboard panel 22 of the main lobe 18. In other words, the assembly 10 includes a second stitch 52 between the inflatable flap 20 and the main lobe 18 about the inlet 48 and the vent 46. After the inlet 48 has been sewn about the vent 46, the upper end 42 of the inflatable flap 20 is sewn closed to contain inflation medium in the inflatable flap 20 when the curtain airbag 16 inflates to the inflated position.

The second embodiment of the assembly 10 is shown in FIG. 6. The third embodiment of the assembly 10 is shown in FIG. 7. The fourth embodiment is shown in FIG. 8. The embodiments shown in FIGS. 6-8 are shown in an uninflated and unassembled position in FIGS. 5A-5C. FIG. 5A shows a front view of the entire assembly 10 in an unassembled and uninflated position. FIG. 5B shows a cross-sectional view through the line B shown in FIG. 5A with the assembly 10 in an uninflated and unassembled position. FIG. 5C shows a cross-sectional view through line C shown in FIG. 5A with the assembly 10 in an uninflated and unassembled position. These three embodiments are assembled in a common manner as described below.

In the embodiments shown in FIGS. 5A-8, the inflatable flap 20 extends from the upper edge 44 of the main lobe 18. The curtain airbag 16 includes a passageway 54 at the upper edge 44 of the main lobe 18 between the inflatable flap 20 and the main lobe 18. As discussed above, the inflatable flap 20 is indirectly fluidly connected to the airbag inflator 14 through the main lobe 18. The passageway 54 is spaced from the airbag inflator 14, i.e., the inflatable flap 20 is in fluid communication with the main lobe 18 through the passageway 54 along the upper edge 44 of the main lobe 18. In other words, the inflatable flap 20 is indirectly fluidly connected to the airbag inflator 14 through the passageway 54.

The inflatable flap 20 includes a first uninflatable portion 56 and a second uninflatable portion 58. In the unassembled position shown in FIG. 5A, the first uninflatable portion 56 and the second uninflatable are spaced from each other. In other words, the first uninflatable portion 56 may be adjacent the passageway 54 and upper edge 44 of the main lobe 18 and the second uninflatable portion 58 may be spaced from the upper edge 44 of the main lobe 18 and the first uninflatable portion 56. The inflation chamber 64 of the inflatable flap 20 is between the first uninflatable portion 56 and the second uninflatable portion 58.

The first uninflatable portion 56 and the second uninflatable portion 58 do not fill with inflation medium when the curtain airbag 16 moves to the inflated position, i.e., the first uninflatable portion 56 and the second uninflatable portion 58 are not included in the inflation chamber 64 of the inflatable flap 20. The first uninflatable portion 56 and the second uninflatable portion 58 may be sealed in any suitable manner, e.g., stitching, adhesive, welding, etc., to prevent inflation medium from filling the first uninflatable portion 56 and the second uninflatable portion 58.

As shown in FIGS. 6-8, as discussed above, the embodiments are shown in the inflated and assembled positions. As shown in these figures, the first uninflatable portion 56 and the second uninflatable portion 58 are fixed to each other in the inflated position. The first uninflatable portion 56 and the second uninflatable portion 58 may be fixed in any suitable manner to limit separation of the portions, e.g., stitching, adhesive, welding, etc.

In the inflated position, the first uninflatable portion 56 and the second uninflatable portion 58 are between the airbag inflator 14 and the main lobe 18. Specifically, the first uninflatable portion 56 and the second uninflatable portion 58 are between the airbag inflator 14 and the upper edge 44 of the main lobe 18. The first uninflatable portion 56 and the second uninflatable portion 58 are adjacent the upper edge 44 of the main lobe 18 in the inflated position.

In the embodiments shown in FIGS. 6-8 wherein the first uninflatable portion 56 and the second uninflatable portion 58 are fixed to each other, the inflatable flap 20 is an endless loop defining a bore 60. The inflation chamber 64 of the inflatable flap 20 extends annularly about the bore 60 from the first uninflatable portion 56 to the second uninflatable portion 58. The bore 60 extends through the endless loop and is fixed about the first uninflatable portion 56 and the second uninflatable portion 58. The bore 60 is exterior to the inflation chamber 64 of the inflatable flap 20, i.e., the inflation chamber 64 of the inflatable flap 20 does not include the bore 60. In the inflated position, the bore 60 extends along an axis that extends along the longitudinal axis of the vehicle 12.

In the embodiment shown in FIG. 6, the inflatable flap 20 extends downwardly from the upper edge 44 of the main lobe 18. In such an embodiment, the inflatable flap 20 may be adjacent the main lobe 18 in the inflated position. Specifically, the inflatable flap 20 may abut the inboard panel 22 of the main lobe 18 and may be connected to the inboard panel 22 of the main lobe 18, e.g., stitched to the inboard panel 22. The bore 60 of the inflatable flap 20 may be between the occupant and airbag inflator 14. The bore 60 may be between the occupant and the main lobe 18.

In the embodiment shown in FIG. 7, the inflatable flap 20 extends upwardly from the upper edge 44 of the main lobe 18. The inflatable flap 20 may extend around the airbag inflator 14 between the airbag inflator 14 and the roof 26 of the vehicle 12. The bore 60 may be between the occupant and the airbag inflator 14.

In the embodiment shown in FIG. 8, the airbag inflator 14 is in the bore 60 of the inflatable flap 20. In such an embodiment, the inflatable flap 20 extends endlessly around the airbag inflator 14. Specifically, the inflatable flap 20 extends from the upper edge 44 of the main lobe 18 and surrounds the airbag inflator 14 when the curtain airbag 16 is in the inflated position. In such an example, the inflatable flap 20 may extend only between the brackets 66 of the airbag inflator 14.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a roof rail;
an airbag inflator mounted to the roof rail; and a curtain airbag supported by the roof rail and including a main lobe and an inflatable flap, the main lobe and the inflatable flap each being inflatable by the airbag inflator to an inflated position;

the main lobe in the inflated position extending downwardly from the roof rail; and the inflatable flap in the inflated position abutting the airbag inflator and being vehicle-inboard relative to the inflator;

the main lobe being directly fluidly connected to the airbag inflator and the inflatable flap being indirectly fluidly connected to the airbag inflator through an opening between the main lobe and the inflatable flap such that inflation medium flows from the airbag inflator through the main lobe and through the opening to the inflatable flap to inflate the inflatable flap;

the main lobe having a vehicle-forward end and a vehicle-rearward end and being elongated along an axis between the vehicle-forward end and the vehicle-rearward end;

the inflatable flap being smaller than the main lobe along the axis and the opening being between the vehicle-forward end and the vehicle-rearward end of the main lobe.

2. The vehicle of claim 1, wherein the main lobe is fluidly connected to the inflatable flap.

3. The vehicle of claim 1, wherein the inflatable flap abuts the main lobe and is vehicle-inboard of the main lobe in the inflated position.

4. The vehicle of claim 1, wherein the main lobe includes an outboard panel, an inboard panel vehicle-inboard of the outboard panel, and an inflation chamber between the outboard panel and the inboard panel, the inflatable flap abutting the inboard panel and being inboard of the inboard panel.

5. The assembly of claim 4, wherein the opening between the main lobe and the inflatable flap is in the inboard panel of the main lobe at a position below the airbag inflator.

6. The vehicle of claim 1, wherein the main lobe includes an upper edge adjacent and extending along the roof rail, the inflatable flap extending from the upper edge of the main lobe.

7. The vehicle of claim 1, wherein the curtain airbag includes a tube extending from the main lobe to the airbag inflator, the inflatable flap abutting the tube.

8. The vehicle of claim 1, wherein the inflatable flap extends from the main lobe below the airbag inflator and extends upwardly from the main lobe above the airbag inflator.

9. The vehicle of claim 1, wherein the inflatable flap is an endless loop defining a bore.

10. The vehicle of claim 9, wherein the airbag inflator is in the bore of the inflatable flap.

11. The vehicle of claim 9, wherein the inflatable flap includes a first uninflatable portion and a second uninflatable portion fixed to each other about the bore.

12. The vehicle of claim 11, wherein the inflatable flap defines an inflation chamber extending annularly about the bore from the first uninflatable portion to the second uninflatable portion.

13. The vehicle of claim 12, wherein the inflation chamber of the inflatable flap is in fluid communication with the main lobe through the opening spaced from the airbag inflator.

14. The vehicle of claim 11, wherein the first uninflatable portion and the second uninflatable portion are between the airbag inflator and the main lobe in the inflated position.

15. The vehicle of claim 1, wherein the main lobe includes an upper edge and the opening is below the upper edge, and wherein the inflatable flap is sewn to the main lobe about the opening.

16. The vehicle of claim 15, wherein the upper edge of the main lobe is stitched closed and an upper edge of the inflatable flap is stitched closed.

17. The assembly of claim 1, wherein the curtain airbag includes a tube extending directly from the airbag inflator to the main lobe to directly fluidly connect the airbag inflator to the main lobe.

18. An assembly comprising:
an airbag inflator; and
a curtain airbag including a main lobe and an inflatable flap, the main lobe and the inflatable flap each inflatable by the airbag inflator to an inflated position;

the main lobe having an inboard panel and an outboard panel;

the inflatable flap in the inflated position being at the inboard panel and abutting the airbag inflator;

the main lobe being directly fluidly connected to the airbag inflator and the inflatable flap being indirectly fluidly connected to the airbag inflator through an opening between the main lobe and the inflatable flap such that inflation medium flows from the airbag inflator through the main lobe and through the opening to the inflatable flap to inflate the inflatable flap;

the main lobe having a vehicle-forward end and a vehicle-rearward end and being elongated along an axis between the vehicle-forward end and the vehicle-rearward end;

the inflatable flap being smaller than the main lobe along the axis and the opening being between the vehicle-forward end and the vehicle-rearward end of the main lobe.

19. The assembly of claim 18, wherein the main lobe is fluidly connected to the inflatable flap.

20. The assembly of claim 18, wherein the inflatable flap extends from the main lobe below the airbag inflator and extends upwardly from the main lobe above the airbag inflator.

* * * * *